(12) United States Patent
Ebenroth et al.

(10) Patent No.: US 12,036,912 B2
(45) Date of Patent: Jul. 16, 2024

(54) CONVERTIBLE FURNITURE SYSTEM AND RV COMPRISING THE SAME

(71) Applicant: Thor Tech, Inc., Elkhart, IN (US)

(72) Inventors: Nick Ebenroth, Goshen, IN (US); Evan VanBelle, Edwardsburg, MI (US)

(73) Assignee: Thor Tech, Inc., Elkhart, IN (US)

( * ) Notice: Subject to any disclaimer, the term of this patent is extended or adjusted under 35 U.S.C. 154(b) by 174 days.

(21) Appl. No.: 17/869,068

(22) Filed: Jul. 20, 2022

(65) Prior Publication Data
US 2023/0028471 A1    Jan. 26, 2023

Related U.S. Application Data

(60) Provisional application No. 63/225,098, filed on Jul. 23, 2021.

(51) Int. Cl.
*B60P 3/39* (2006.01)
*B60N 3/00* (2006.01)

(52) U.S. Cl.
CPC .............. *B60P 3/39* (2013.01); *B60N 3/001* (2013.01); *B60N 3/008* (2013.01)

(58) Field of Classification Search
CPC ...... B60P 3/39; B60P 3/34; B60P 3/36; B60P 3/38; B62D 33/0612; B60N 3/001; B60N 3/008; B63B 2029/046; B63B 29/04; A47C 17/80; A47C 17/84; A47C 17/62
USPC ................. 296/168, 164, 156, 190.02; 5/118
See application file for complete search history.

(56) References Cited

U.S. PATENT DOCUMENTS

| | | | | |
|---|---|---|---|---|
| 60,339 | A | * | 12/1866 | Burr ....................... A47C 17/62 5/4 |
| 3,161,892 | A | * | 12/1964 | Ducrot ................... A47C 17/60 5/5 |
| 3,638,249 | A | * | 2/1972 | Katsigarakis .......... A47C 17/60 5/9.1 |
| 4,277,856 | A | * | 7/1981 | Danin .................... A47C 17/62 297/157.1 |

(Continued)

FOREIGN PATENT DOCUMENTS

DE     102021103393 A1 *  8/2021

*Primary Examiner* — Amy R Weisberg
*Assistant Examiner* — Wenwei Zhuo
(74) *Attorney, Agent, or Firm* — DINSMORE & SHOHL LLP (57) ABSTRACT

A recreational vehicle includes a convertible furniture system positioned in a storage area. The convertible furniture system includes a lift system, attachment hardware, and a convertible furniture piece. The lift system includes a platform movably coupled to a set of rails and movable along a length of the rails. The convertible furniture piece includes a pair of side support frames each pivotally attached to a base frame to pivot between a countertop configuration and a bed configuration, and a countertop attached to the side support frames. In the countertop configuration, the side support frames extend from the base frame to support the countertop above the base frame. In the bed configuration, the side support frames extend from the base frame to define a planar surface. The attachment hardware permits selective attachment of the convertible furniture piece to the platform when the convertible furniture piece is in the bed configuration.

20 Claims, 8 Drawing Sheets

(56) References Cited

U.S. PATENT DOCUMENTS

| | | | | |
|---|---|---|---|---|
| 5,440,768 | A * | 8/1995 | Danin | A47C 17/60 |
| | | | | 5/4 |
| 7,121,612 | B2 * | 10/2006 | Rasmussen | B60P 3/39 |
| | | | | 296/156 |
| 8,572,776 | B2 * | 11/2013 | Grubb | A47C 17/52 |
| | | | | 5/151 |
| 10,376,073 | B2 * | 8/2019 | Grubb | A47C 17/54 |
| D931,007 | S * | 9/2021 | Rytman | D6/383 |
| 2008/0001427 | A1 * | 1/2008 | Day | B60P 3/39 |
| | | | | 296/156 |
| 2012/0119539 | A1 * | 5/2012 | Siegert | B60P 3/39 |
| | | | | 296/174 |
| 2015/0329035 | A1 * | 11/2015 | Johnson | A47C 17/80 |
| | | | | 5/503.1 |
| 2016/0264217 | A1 | 9/2016 | Heimerl | |
| 2019/0217752 | A1 * | 7/2019 | Johnson | B60N 3/008 |
| 2020/0239112 | A1 * | 7/2020 | Farmer | A47C 13/00 |

\* cited by examiner

CONVERTIBLE FURNITURE SYSTEM AND RV COMPRISING THE SAME

CROSS-REFERENCE TO RELATED APPLICATIONS

This application claims the benefit of U.S. Provisional Pat. App. No. 63/225,098, filed on Jul. 23, 2021, and entitled "Convertible Bar for a Recreational Vehicle."

BACKGROUND

Recreational vehicles (RVs) typically house a variety of different types of furniture in a limited space. The present inventors have recognized a continuing need in the RV industry to increase the capacity of RVs to accommodate different types of furniture in a common area of the RV.

BRIEF SUMMARY

The subject matter of the present disclosure relates to the provision of convertible furniture such as, for example, a convertible bar/bed or bar/bench, in an otherwise occupied space of an RV. More specifically, the present disclosure is directed to a convertible furniture piece that can be integrated with a corresponding furniture piece in the RV using a lift system. For example, in particular embodiments of the present disclosure, the convertible furniture is integrated with a lift-operated bunk in the garage area of a toy hauler or similar RV.

In accordance with one embodiment of the present disclosure, a recreational vehicle includes a chassis, at least one axle assembly coupled to the chassis, a vehicle body supported by the chassis, a storage area defined in a rear portion of the vehicle body and including a pair of walls extending vertically from a floor of the storage area, a living area forward of the storage area, and a convertible furniture system positioned in the storage area, the convertible furniture system including a lift system, attachment hardware, and a convertible furniture piece selectively attachable to the lift system using the attachment hardware. The lift system includes a set of vertically extending rails coupled to the pair of walls of the storage area and a platform movably coupled to the set of rails and movable along a length of the rails in a vertical direction. The convertible furniture piece includes a base frame, a pair of side support frames each pivotally attached to the base frame to pivot between a countertop configuration and a bed configuration, and at least one countertop attached to at least one of the pair of side support frames. In the countertop configuration, the side support frames extend from the base frame in the vertical direction to support the countertop above the base frame. In the bed configuration, the side support frames extend from the base frame in a horizontal direction to define collectively a planar sleeping surface. The attachment hardware permits selective attachment of the convertible furniture piece to the platform when the convertible furniture piece is in the bed configuration.

In accordance with another embodiment of the present disclosure, a convertible furniture system includes a lift system, attachment hardware, and a convertible furniture piece selectively attachable to the lift system using the attachment hardware. The lift system includes a set of vertically extending rails and a platform movably coupled to the set of rails and movable along a length of the rails in a vertical direction. The convertible furniture piece includes a base frame, a pair of side support frames each pivotally attached to the base frame to pivot between a countertop configuration and a bed configuration, and at least one countertop attached to at least one of the pair of side support frames. In the countertop configuration, the side support frames extend from the base frame in the vertical direction to support the countertop above the base frame. In the bed configuration, the side support frames extend from the base frame in a horizontal direction to define collectively a planar sleeping surface. The attachment hardware permits selective attachment of the convertible furniture piece to the platform when the convertible furniture piece is in the bed configuration.

Although the concepts of the present disclosure are described herein with primary reference to toy haulers and other types of recreational vehicles, it is contemplated that the concepts will enjoy applicability to any trailer, motor home, or other application.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Embodiments disclosed herein are generally directed to a recreational vehicle including a convertible furniture system provided therein. The convertible furniture system is provided in a storage area of the recreational vehicle, and includes a lift system, a convertible furniture piece, and attachment hardware. The convertible furniture system can be freely movable, or portable, to allow the convertible furniture system to be moved around a space inside the recreational vehicle or moved outside of the recreational vehicle. The lift system includes a platform that can be raised and lowered within the storage area. The convertible furniture piece is a bar that is convertible into a bed to allow a user to sleep thereon. In the bed configuration, the convertible furniture piece lays flat to allow the convertible furniture piece to be attached to the platform of the lift system via the attachment hardware. Once attached to the platform, the convertible furniture piece can be raised with the platform to be spaced apart from a floor of the storage area and to allow items, furniture, and/or vehicles to be stored in the storage area below the convertible furniture piece. Various embodiments of the recreational vehicle and the convertible furniture system, and the operation thereof, will be described in greater detail herein.

Figure 1:
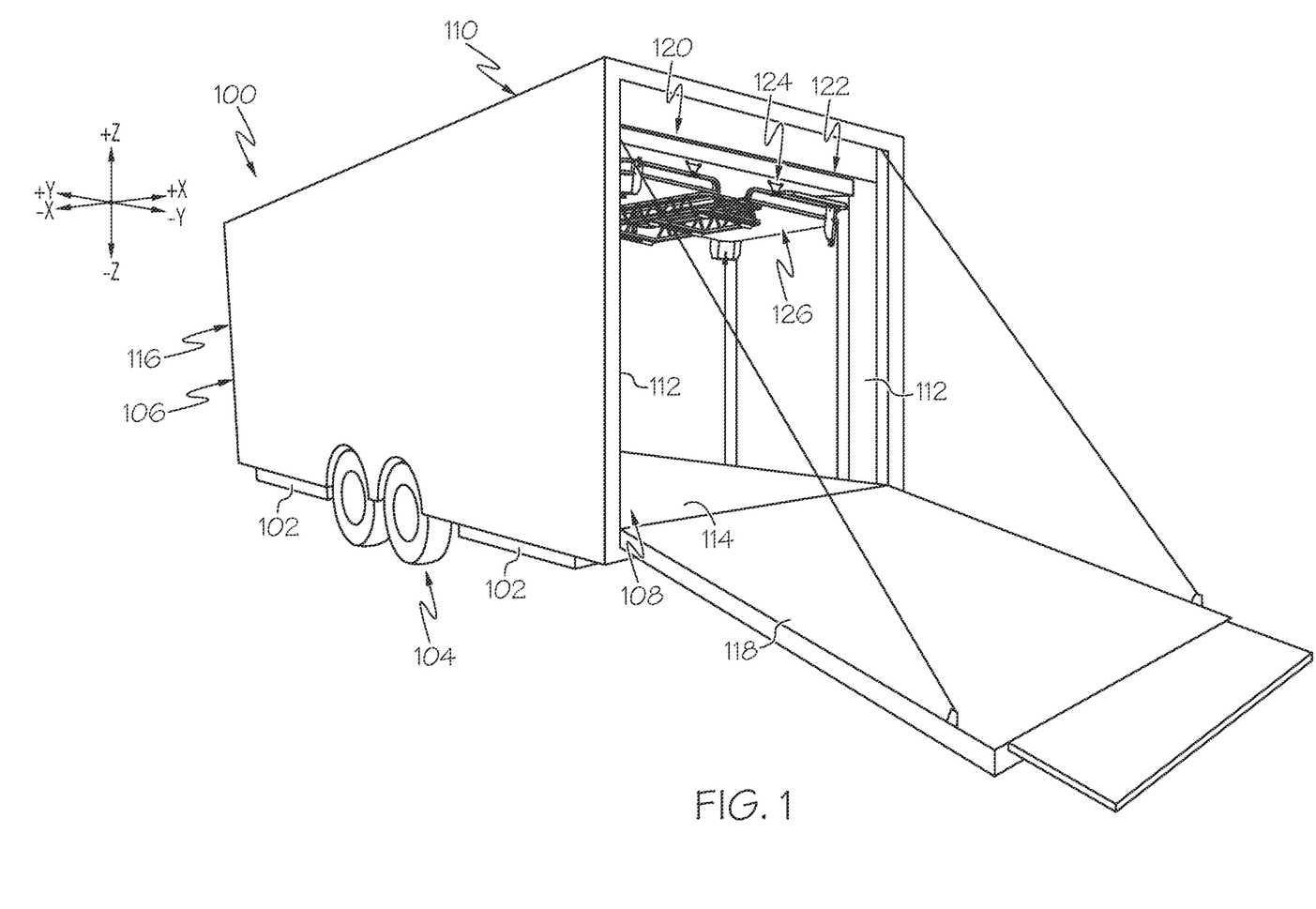
FIG. 1 is a schematic illustration of a recreational vehicle according to one embodiment of the present disclosure.

As used throughout the ensuing description, the term "longitudinal direction" refers to the forward-rearward direction of the recreational vehicle (i.e., in the +/−Y-direction depicted in FIG. 1). The term "lateral direction" refers to the cross-vehicle direction (i.e., in the +/−X-direction depicted in FIG. 1), and is transverse to the longitudinal direction. As used herein, the term "horizontal direction" may refer to either the lateral direction or the longitudinal direction. The term "vertical direction" or "above" or "below" refer to the upward-downward direction of the recreational vehicle (i.e., in the +/−Z-direction depicted in FIG. 1).

FIG. 1 illustrates a recreational vehicle 100 comprising a chassis 102, at least one axle assembly 104 coupled to the chassis 102, a vehicle body 106 supported by the chassis 102, a storage area 108 defined in a rear portion 110 of the vehicle body 106, a living area 116 forward of the storage area 108, and a convertible furniture system 120 positioned in the storage area 108. The storage area 108 may include a floor 114 and a pair of walls 112 extending vertically from the floor 114 of the storage area 108. The recreational vehicle 100 may further include a rear gate 118 pivotally coupled to the rear portion 110 of the vehicle body 106. The rear gate 118 may be pivotable to a ramp position to act as a ramp, allowing vehicles, such as a dirt bike or a side-by-side, to enter and exit the storage area 108. The rear gate 118 may pivot from the ramp position to a closed position (not shown) to extend in parallel with the walls 112 of the storage area 108 and enclose the storage area 108.

As depicted in FIG. 1, the recreational vehicle 100 is a toy hauler. As used herein, a "toy hauler" is a recreational vehicle having a rear gate, or ramp door, that pivots off of a rear portion of the recreational vehicle to allow a vehicle, such as a side-by-side, a dirt bike, an all-terrain vehicle (ATV), or the like, to travel up and down the rear gate to enter and exit the recreational vehicle. However, it is contemplated and possible that the recreational vehicle 100 may be any towable trailer or motorized recreational vehicle 100, such as a motorhome, a fifth wheel camper, a travel trailer, a teardrop camper, a tiny trailer, a pop-up camper, or any other recreational vehicle 100. In any of the above recreational vehicles, the axle assembly 104 may be a driven or non-driven axle assembly 104.

Figure 2:
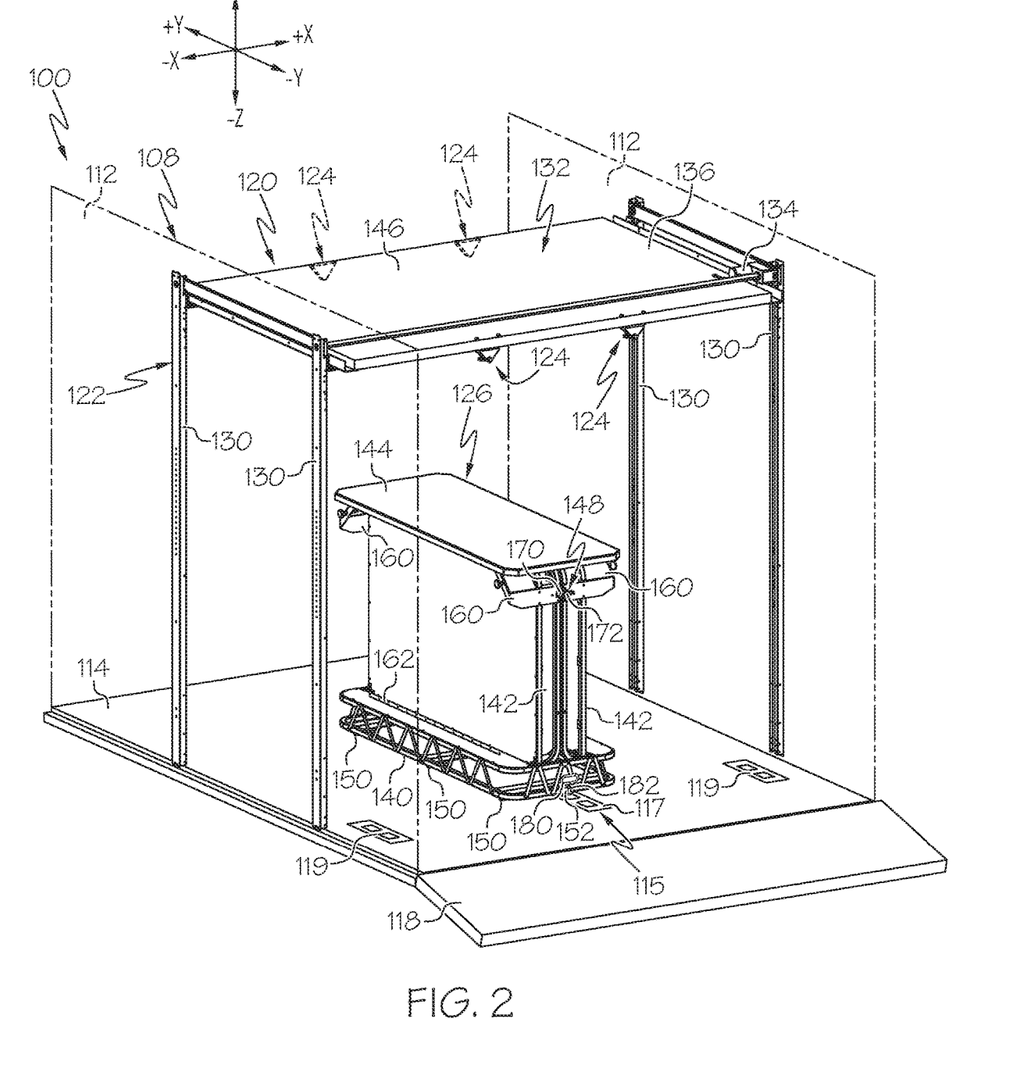
FIG. 2 is a schematic illustration of a convertible furniture system in a storage area of the recreational vehicle of FIG. 1, the convertible furniture system including a convertible furniture piece in a bar configuration, according to one embodiment of the present disclosure.

Referring now to FIG. 2, in embodiments, the recreational vehicle 100 may include a plurality of tie down securement locations 115 including a central tie down securement location 117 and a pair of lateral tie down securement locations 119 spaced laterally from the central tie down securement location 117 with the central tie down securement location 117 positioned between the pair of lateral tie down securement locations 119. Each of the pair of lateral tie down securement locations 119 may be positioned adjacent a respective one of the pair of walls 112 of the storage area 108.

Referring still to FIG. 2, the convertible furniture system 120 may include a lift system 122, attachment hardware 124, and a convertible furniture piece 126. The convertible furniture piece 126 may be selectively attachable to the lift system 122 using the attachment hardware 124. As will be described in greater detail herein, the convertible furniture piece 126 may be convertible between a countertop configuration and a bed configuration where, in the countertop configuration, the convertible furniture piece 126 operates as a counter and, in the bed configuration, the convertible furniture piece 126 operates as a bed. However, it is contemplated and possible that the convertible furniture piece 126 may be convertible to different configurations to perform functions different from functioning as a counter and/or the bed.

As shown in FIG. 2, the convertible furniture system 120 is positioned in the storage area 108 of the recreational vehicle 100. However, this is merely exemplary such that the convertible furniture system 120 may be positioned anywhere within the recreational vehicle 100, such as, for example, the living area 116 (FIG. 1). It is contemplated and possible that the convertible furniture system 120 may be separate from the recreational vehicle 100 such that the convertible furniture system 120 may be used in another environment, such as a residential or commercial building. It is further contemplated and possible that the convertible furniture piece 126 may be removed from the recreational vehicle 100 and used outside of the recreational vehicle 100, such as at a campsite. As will be described in greater detail herein, the convertible furniture piece 126 may be free-moving, or portable, to allow the convertible furniture piece 126 to be moved to different locations inside and/or outside of the recreational vehicle 100.

The lift system 122 may include a set of vertically extending rails 130 coupled to the pair of walls 112 of the storage area 108, a platform 132 movably coupled to the set of rails 130 and movable along a length of the rails 130 in the vertical direction, and a lift mechanism 134. The lift mechanism 134 may be a lift motor or a manual crank operatively coupled to the platform 132 to raise and lower the platform 132. The set of vertically extending rails 130 may extend in the vertical direction from the floor 114 of the storage area 108 toward a ceiling (not shown). The platform 132 of the lift system 122 may form an upper sleeping surface 136 as a top bunk over the convertible furniture piece 126 in the bed configuration. The lift system 122 may further include a mattress 138 positioned on the upper sleeping surface 136.

The convertible furniture piece 126 may include a base frame 140, a pair of side support frames 142 each pivotally attached to the base frame 140 to pivot between a countertop configuration and a bed configuration, at least one countertop 144 attached to at least one of the pair of side support frames 142, a mattress 146 (FIG. 3), a locking mechanism 148, a set of rollers 150, a floor mount assembly 152, one or more linkages 154 (FIG. 5) movably coupling the countertop 144 to the side support frames 142, a latch mechanism 156 (FIG. 6), a pair of rubber stops 158 (FIG. 5), and one or more stands 160. The pair of side support frames 142 may each be pivotally attached to the base frame 140 via a hinge 162 positioned between the respective side support frame 142 and the base frame 140. The hinges may be any known hinge that is capable of pivoting the side support frames 142 relative to the base frame 140, such as, for example, a piano hinge. It is further contemplated that suitable hydraulic lift assists can be attached between an end of the side support frames 142 and the base frame 140 to assist with moving the side support frames 142 between the bed and countertop configurations.

Referring to FIG. 2, the locking mechanism 148 may include a receiver 170 attached to one of the side support frames 142, and a coupler 172 attached to the other of the side support frames 142 that selectively engages the receiver 170 to retain the convertible furniture piece 126 in the countertop configuration, and when the coupler 172 disengages the receiver 170, the convertible furniture piece 126 is permitted to move from the countertop configuration to the bed configuration. The receiver 170 may include a latch and the coupler 172 may include a buckle that selectively engages the latch when the side support frames 142 are in the countertop configuration.

Referring still to FIG. 2, the set of rollers 150 may be rotatably attached to the base frame 140 to permit the convertible furniture piece 126 to move about the floor 114 of the storage area 108. The rollers 150 may be positioned at a bottom of the base frame 140 to contact the floor 114 of the storage area 108 and support the base frame 140. The rollers 150 may permit the convertible furniture piece 126 to move in the longitudinal direction and/or the lateral direction. The rollers 150 may be any operable structure for allowing the convertible furniture piece 126 to move, such as, for example, wheels, casters, or the like. The convertible furniture piece 126 may include any operable number of rollers 150, such as one, two, three, four, five, six, or more than six. While the depicted convertible furniture piece 126 includes rollers 150 for permitting movement of the convertible furniture piece 126, it is contemplated and possible that the convertible furniture piece 126 does not include rollers 150 so that the convertible furniture piece 126 is stationary within the recreational vehicle 100.

The floor mount assembly 152 may selectively engage one of the plurality of tie down securement locations to restrict movement of the convertible furniture piece 126. The floor mount assembly 152 may include a mounting bracket 180 attached to the base frame 140, and a coupling pin 182 that extends through the mounting bracket 180 to engage the base frame 140. The coupling pin 182 may extend from the mounting bracket 180 into one of the tie down securement locations in the storage area 108 to fix the position of the convertible furniture piece 126.

In some embodiments, the convertible furniture piece 126 may include a pair of countertops with one of the countertops being attached to one of the side support frames 142, and the other of the countertops being attached to the other of the side support frames 142. In such embodiments, the pair of countertops may be fixedly coupled to the respective side support frames 142. In other embodiments, the at least one countertop 144 may include a single countertop attached to only one of the pair of side support frames 142. In such embodiments, the one or more linkages 154 may movably couple the countertop 144 to the one of the side support frames 142. As will be described in greater detail herein, the countertop 144 may be movable between a table mode and a collapsed mode.

Figure 3:
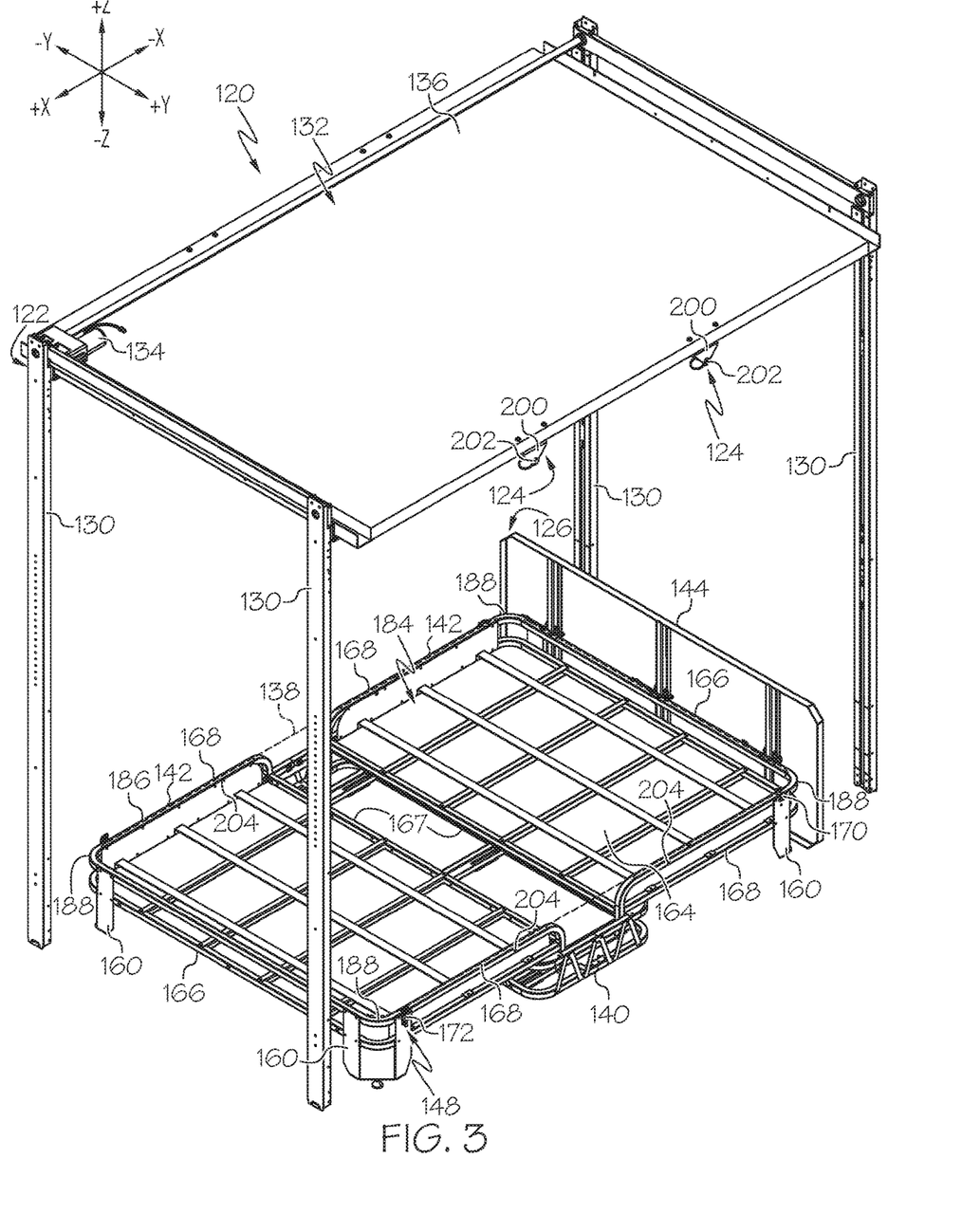
FIGS. 3 and 4 are schematic illustrations of the convertible furniture system of FIG. 2 with the convertible furniture piece in a bed configuration, according to one embodiment of the present disclosure.

Referring to FIG. 3, the mattress 138 may be disposed within a cavity 184 defined by the side support frames 142, wherein the side support frames 142 further define a bed frame 186 for supporting the mattress 138 when in the bed configuration. The mattress 138 may be foldable such that when the side support frames 142 transition from the bed configuration to the countertop configuration, the mattress 138 may be folded between the pair of side support frames 142.

Referring now to FIGS. 2 and 3, as mentioned above, the pair of side support frames 142 may pivot between the countertop configuration and the bed configuration to perform separate functions in each of the configurations. Referring to FIG. 2, in the countertop configuration, the side support frames 142 may extend from the base frame 140 in the vertical direction to support the countertop above the base frame 140. In the countertop configuration, the convertible furniture piece 126 may operate as a bar or table for supporting beverages, food, or the like. Referring to FIG. 3, in the bed configuration, the side support frames 142 may extend from the base frame 140 in the horizontal direction to define collectively a planar sleeping surface 164. The planar sleeping surface 164 may be sized to accommodate a sleeping person, e.g., in the form of a single, double, full, queen, or king-sized bed. However, the planar sleeping surface 164 may be any size that accommodates any sized person, such as babies and/or adults, or an animal, such as a dog or a cat.

Figure 4:
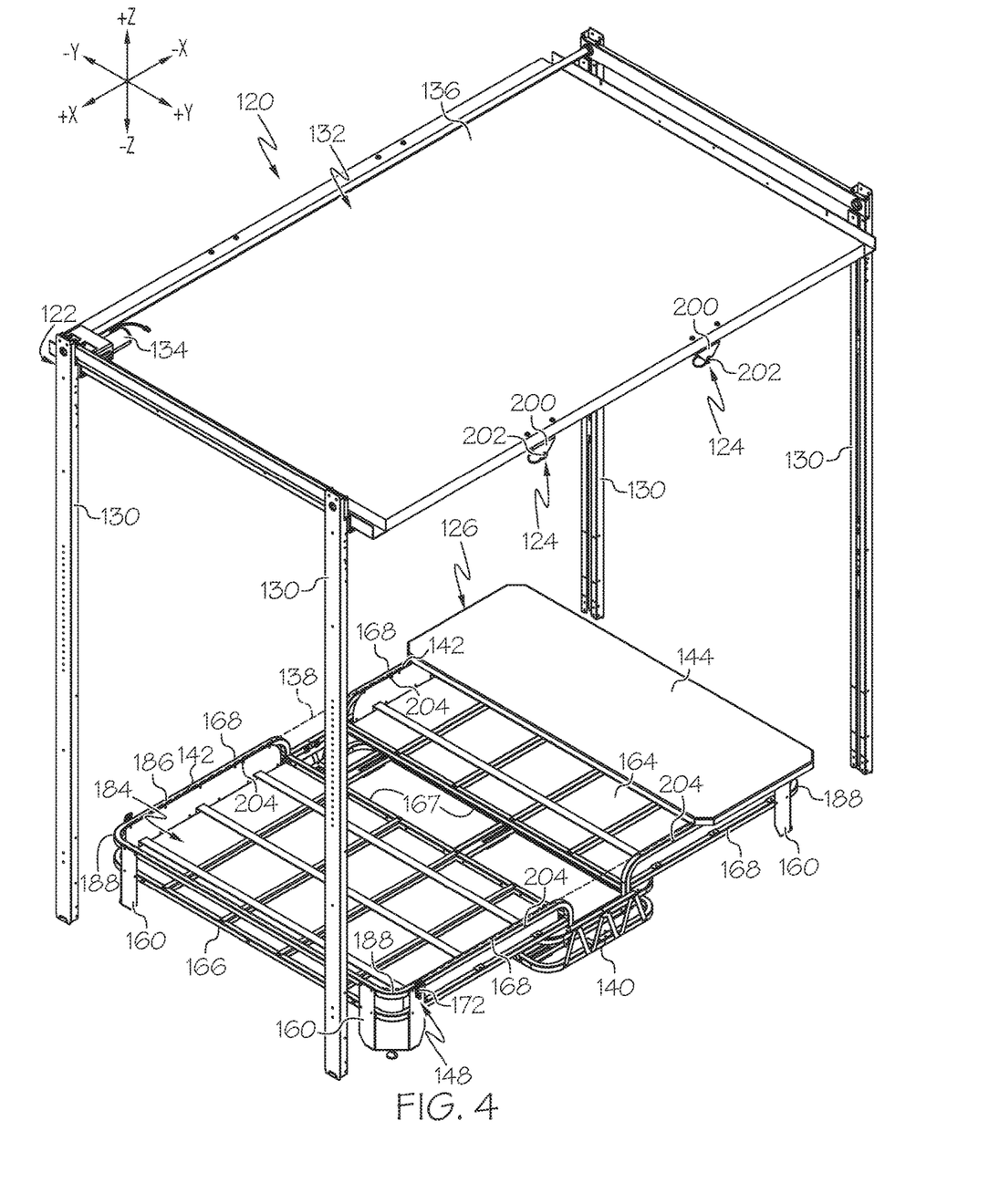

Referring to FIGS. 3 and 4, as briefly mentioned above, the countertop 144 may be movable between a table mode and a collapsed mode. Referring to FIG. 3, in the table mode, the countertop 144 extends perpendicularly to the planar sleeping surface 164 when the side support frames 142 are in the bed configuration. In the table mode, the countertop 144 may extend relative to the side support frames 142 to operate as a headboard that may secure pillows or a user's head when placed on the side support frames 142. The countertop 144 may be in the table mode when the side support frames 142 are in either of the countertop configuration or the bed configuration. When in the table mode, the side support frames 142 may be moved into the countertop configuration so that the countertop 144 extends in parallel with the floor 114 of the storage area 108, allowing the countertop 144 to support items placed on top of the countertop 144.

Referring to FIG. 4, in the collapsed mode, the countertop 144 extends in parallel with the planar sleeping surface 164. When in the collapsed mode, the countertop 144 extends with the side support frames 142 so that the countertop 144 does not extend vertically from the side support frames 142, thereby allowing the side support frames 142 to be attached to the platform 132 of the lift system 122.

Referring to FIG. 3, the one or more stands 160 may each be positioned at a plurality of corners 188 of the side support frames 142. Each of the side support frames 142 may further include an outer side 166, an opposite inner side 167 that is pivotally coupled to the base frame 140, and a pair of lateral sides 168 each extending between the outer side 166 and the inner side 167 to intersect the outer side 166. The side support frames 142 may each define a pair of corners 188 of the plurality of corners 188 at the intersection between the respective pair of lateral sides 168 and the respective outer side 166. The one or more stands 160 may include any operable number of stands 160, such as one, two, three, four, or more than four.

Referring still to FIG. 3, in embodiments, the convertible furniture piece 126 may only include stands 160 attached to one of the side support frames 142. In such embodiments, when in the table mode, the countertop 144 may extend from the one of the side support frames 142 to contact the floor 114 of the storage area 108 and support the one of the side support frames 142. The convertible furniture piece 126 may include stands 160 extending from the other of the side support frames 142 to contact the floor 114 of the storage area 108 and support the other of the side support frames 142 while the countertop 144 supports the one of the side support frames 142. However, it is contemplated and possible that the convertible furniture piece 126 includes stands 160 attached to each of the side support frames 142 and that the countertop 144 may additionally support the one of the side support frames 142 when in the table mode.

Figure 5:
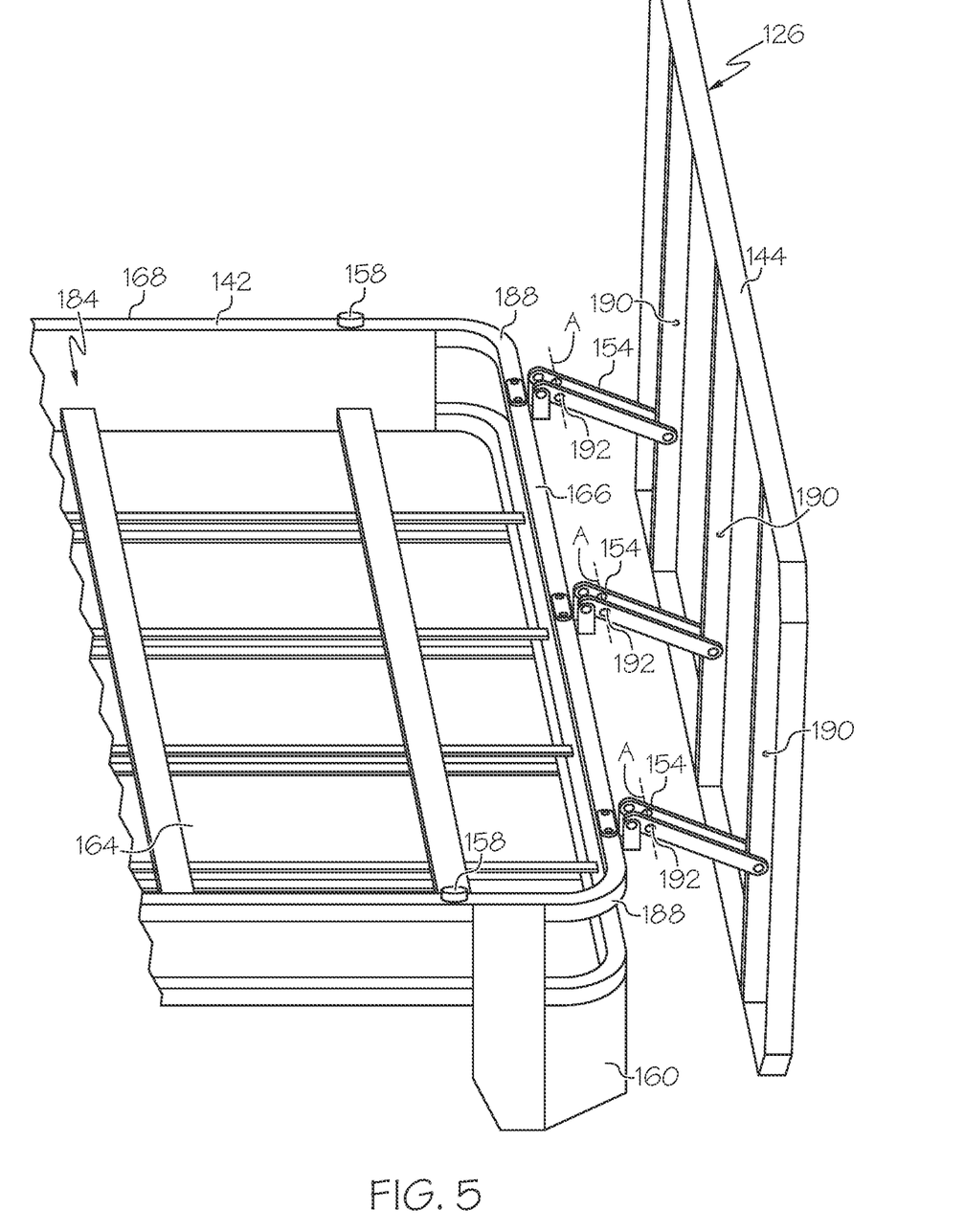
FIG. 5 is a partial schematic illustration of the convertible furniture piece of FIG. 3 with a countertop moving between a table mode and a collapsed mode, according to one embodiment of the present disclosure.
Figure 6:
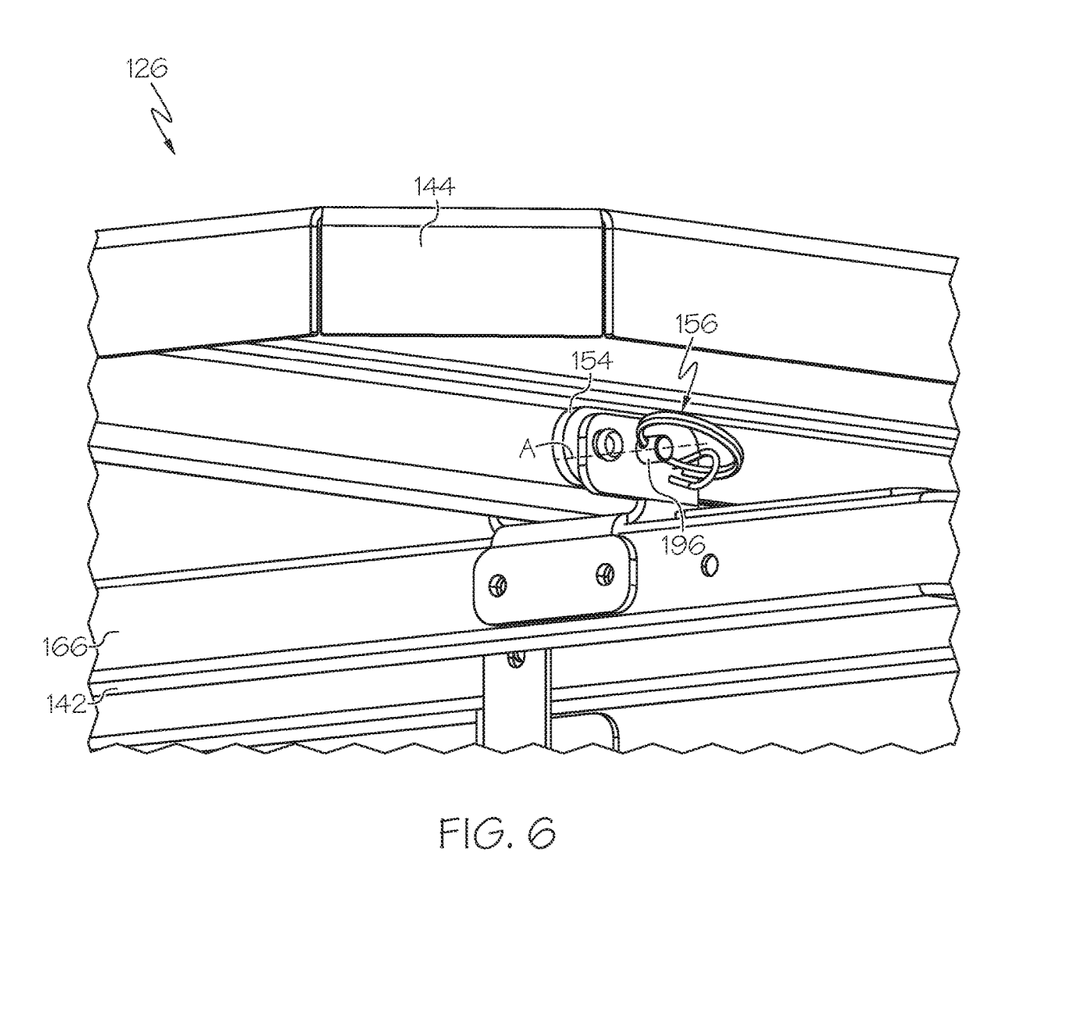
FIG. 6 is a partial schematic illustration of the convertible furniture piece of FIG. 5 with the countertop locked in the table mode, according to one embodiment of the present disclosure.

Referring to FIGS. 5 and 6, the countertop 144 may define at least one opening 190 spaced apart from the one or more linkages 154, and the one or more linkages 154 each define a complementary opening 192 extending therethrough that aligns with the opening 190 in the countertop 144 when the countertop 144 is in the table mode. When the opening 190 in the countertop 144 is aligned with the opening 192 in each of the linkages 154, each of the opening 190 and the opening 192 may concentrically surround an axis A so that a pin may extend along the axis A to pass through each of the openings 190, 192. The latch mechanism 156 may include a pin 196 that extends into the opening 190 in the countertop and the opening 192 in the linkages 154 to maintain the countertop in either of the collapsed mode or the table mode. While the depicted latch mechanism 156 includes the pin 196, it is contemplated and possible that the convertible furniture piece 126 includes any operable structure for maintaining the countertop in either of the collapsed mode or the table mode.

Referring to FIG. 5, the convertible furniture piece 126 may include the pair of rubber stops 158 attached to one of the pair of side support frames 142 at a location to be positioned between the countertop 144 and the one of the pair of side support frames 142 when the countertop 144 is in the collapsed mode. The rubber stops 158 may additionally be positioned between the pair of side support frames 142 when the convertible furniture piece 126 is in the countertop configuration to space apart each of the pair of side support frames 142 when in the countertop configuration.

Referring to FIGS. 2-4 and 7-8, the attachment hardware 124 permits selective attachment of the convertible furniture piece 126 to the platform 132 when the convertible furniture piece 126 is in the bed configuration. The attachment hardware 124 may include a plurality of coupling brackets 200 fixed to the platform 132 and a plurality of pins 202 that extend through one of the respective coupling brackets 200 and the convertible furniture piece 126 to attach the convertible furniture piece 126 to the platform 132. The attachment hardware 124 may further include a set of holes 204 formed in the side support frames 142. The holes 204 may be sized and positioned so that the pin 202 of the attachment hardware 124 may extend through the hole 204 formed in the side support frames 142 when extended through the coupling bracket 200. The holes 204 may be positioned along the side support frames 142 closer to the inner side 167 than the outer side 166. The holes 204 in each of the side support frames 142 may be positioned opposite one another in each of the pair of lateral sides 168.

Figure 7:
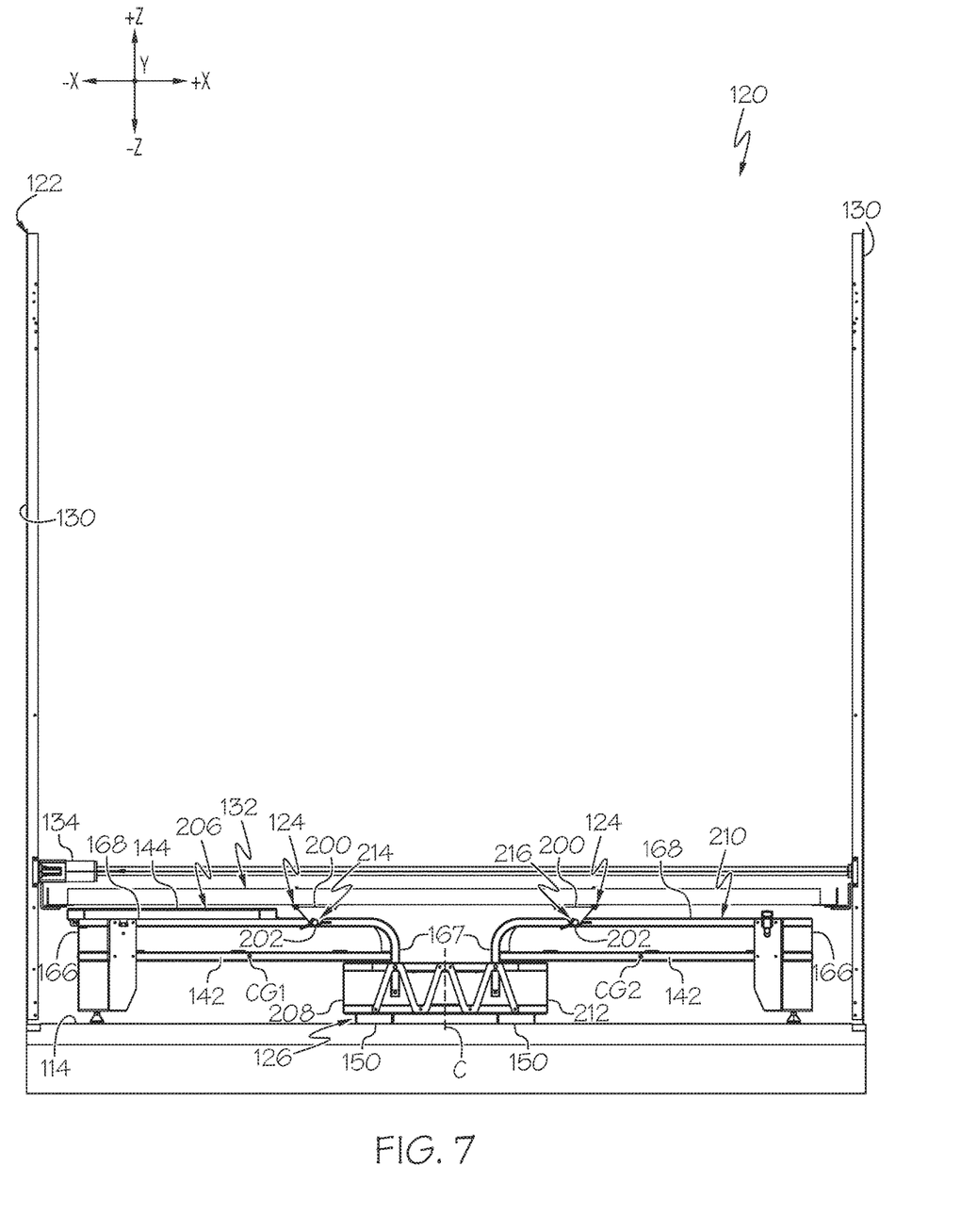
FIG. 7 is a schematic illustration of the convertible furniture piece of FIG. 3 attached to a lift system of the convertible furniture system, according to one embodiment of the present disclosure.
Figure 8:
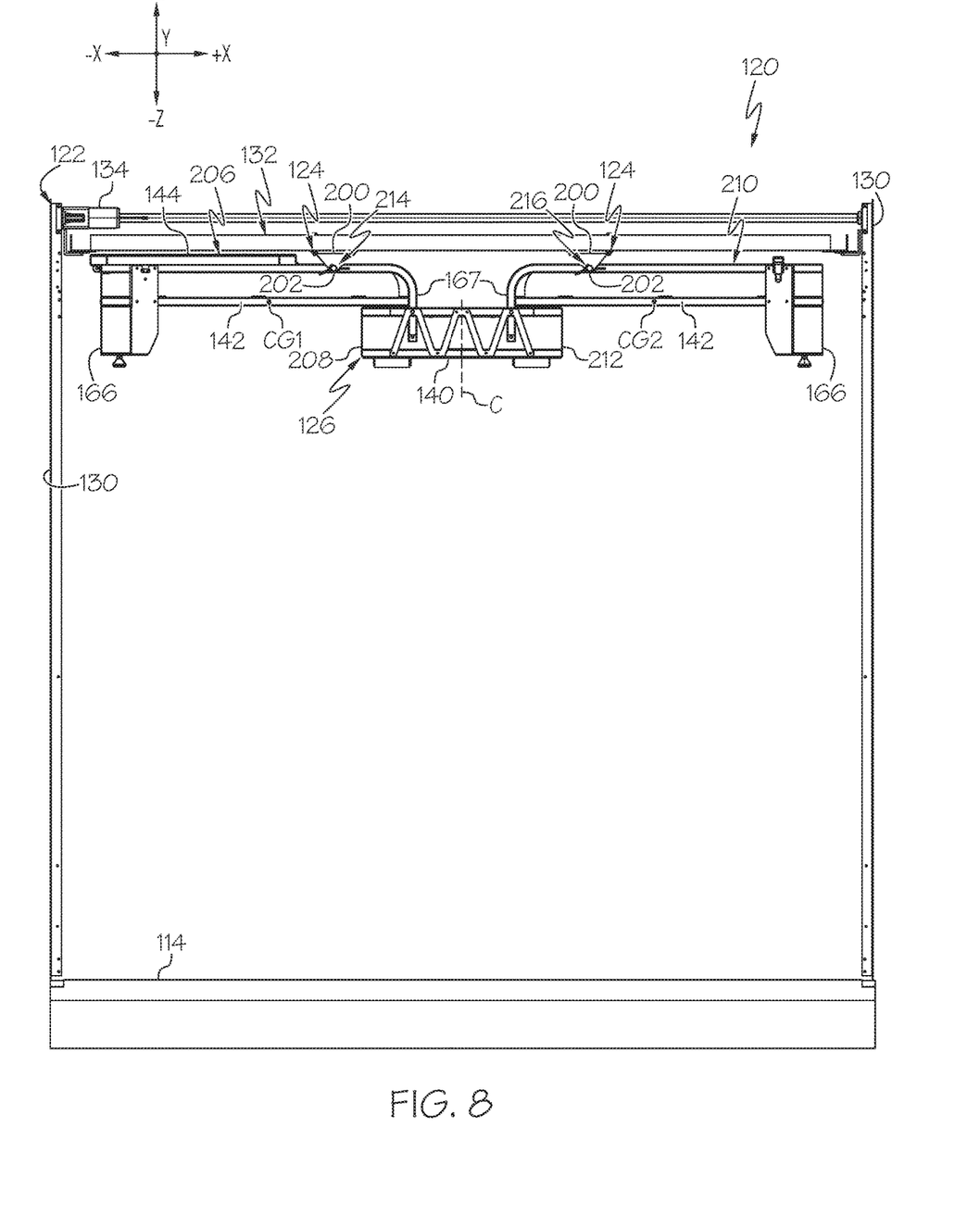
FIG. 8 is a schematic illustration of the convertible furniture piece of FIG. 7, with the furniture piece raised off a floor of the storage area by the lift system, according to one embodiment of the present disclosure.

Referring to FIGS. 7 and 8, the holes 204 may additionally be positioned along the side support frames 142 so that that convertible furniture piece 126 does not sag from the platform 132 when the convertible furniture piece 126 is attached to the platform 132 and raised off the ground. Particularly, the convertible furniture piece 126 may include a first portion 206 including one of the side support frames 142 and a portion of the base frame 140 extending from a center C of the base frame 140 to a first side 208 of the base frame 140, and a second portion 210 including the other of the side support frames 142 and a portion of the base frame 140 extending from the center C of the base frame 140 to a second side 212 of the base frame 140 opposite the first side 208. The holes 204 may include a first hole 214 formed in the one of the side support frames 142 between a center of gravity CG1 of the first portion 206 and the center C of the base frame 140, and a second hole 216 formed in the other of the side support frames 142 between a center of gravity CG2 of the second portion 210 and the center of the base frame 140. In such a configuration, each of the holes 204 are positioned so that the side support frames 142 pivot about the pin 202 and away from the base frame 140 so that the base frame 140 does not sag.

As shown in FIGS. 7 and 8, once the convertible furniture piece 126 is attached to the platform 132 using the attachment hardware 124, the convertible furniture piece 126 can be raised and lowered with the platform 132. As shown in FIG. 8, the convertible furniture piece 126 may be raised off the floor 114 to allow for additional storage space in the storage area 108.

It is also noted that recitations herein of "at least one" component, element, etc., should not be used to create an inference that the alternative use of the articles "a" or "an" should be limited to a single component, element, etc. For example, the convertible furniture piece mentioned above is described with reference to "a" locking mechanism. However, the convertible furniture piece may include one or more locking mechanisms.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A recreational vehicle comprising a chassis, at least one axle assembly coupled to the chassis, a vehicle body supported by the chassis, a storage area defined in a rear portion of the vehicle body and comprising a pair of walls extending vertically from a floor of the storage area, a living area forward of the storage area, and a convertible furniture system positioned in the storage area, the convertible furniture system comprising a lift system, attachment hardware, and a convertible furniture piece selectively attachable to the lift system using the attachment hardware, wherein:

the lift system comprises a set of vertically extending rails coupled to the pair of walls of the storage area and a platform movably coupled to the set of rails and movable along a length of the rails in a vertical direction;

the convertible furniture piece comprising a base frame, a pair of side support frames each pivotally attached to the base frame to pivot between a countertop configuration and a bed configuration, and at least one countertop attached to at least one of the pair of side support frames;

in the countertop configuration, the side support frames extend from the base frame in the vertical direction to support the countertop above the base frame;

in the bed configuration, the side support frames extend from the base frame in a horizontal direction to define collectively a planar sleeping surface; and the attachment hardware permits selective attachment of the convertible furniture piece to the platform when the convertible furniture piece is in the bed configuration.

2. The recreational vehicle of claim 1, wherein the platform of the lift system forms an upper sleeping surface as a top bunk over the convertible furniture piece in the bed configuration.

3. The recreational vehicle of claim 2, wherein the lift system further comprises a mattress positioned on the upper sleeping surface.

4. The recreational vehicle of claim 1, wherein the at least one countertop is a single countertop attached to only one of the pair of side support frames, or a pair of countertops, one of the countertops being attached to one of the side support frames, and the other of the countertops being attached to the other of the side support frames.

5. The recreational vehicle of claim 1, wherein the convertible furniture piece further comprises a mattress disposed within a cavity defined by the side support frames, and the side support frames further define a bed frame for supporting the mattress when in the bed configuration.

6. The recreational vehicle of claim 1, wherein the countertop extends from the one of the side support frames to contact the floor of the storage area and support the one of the side support frames, and the convertible furniture piece further comprises a stand extending from the other of the side support frames to contact the floor of the storage area and support the other of the side support frames.

7. The recreational vehicle of claim 1, wherein:
the convertible furniture piece further comprises four stands each positioned at a plurality of corners of the side support frames;
each of the side support frames further comprise an outer side, an opposite inner side pivotally coupled to the base frame, and a pair of lateral sides each extending between the outer side and the inner side to intersect the outer side; and
the side support frames each define a pair of corners of the plurality of corners at the intersection between the pair of lateral sides and the outer side.

8. The recreational vehicle of claim 1, wherein:
the convertible furniture piece further comprises one or more linkages that movably couple the countertop to one of the side support frames;
the countertop is movable between a table mode and a collapsed mode;
in the collapsed mode, the countertop extends in parallel with the planar sleeping surface; and
in the table mode, the countertop extends perpendicularly to the planar sleeping surface.

9. The recreational vehicle of claim 8, wherein:
the countertop defines an opening spaced apart from the one or more linkages;
the one or more linkages each define an opening extending therethrough; and
the convertible furniture piece further comprises a latch mechanism comprising a pin that extends into the opening in the countertop and the opening in the linkages to maintain the countertop in the collapsed mode or the table mode.

10. The recreational vehicle of claim 8, wherein the convertible furniture piece further comprises a pair of rubber stops attached to one of the pair of side support frames at a location to be positioned between the countertop and the one of the pair of side support frames when the countertop is in the collapsed mode, and positioned between the pair of side support frames when the convertible furniture piece is in the countertop configuration.

11. The recreational vehicle of claim 1, wherein the convertible furniture piece further comprises a locking mechanism comprising a receiver attached to one of the side support frames, and a coupler attached to the other of the side support frames that selectively engages the receiver to retain the convertible furniture piece in the countertop configuration, and when the coupler disengages the receiver, the convertible furniture piece is permitted to move from the countertop configuration to the bed configuration.

12. The recreational vehicle of claim 1, wherein the convertible furniture piece further comprises a set of rollers rotatably attached to the base frame to permit the convertible furniture piece to move about the floor of the storage area.

13. The recreational vehicle of claim 12, wherein the convertible furniture piece further comprises a floor mount assembly comprising a mounting bracket attached to the base frame, and a coupling pin that extends through the mounting bracket into a tie down securement location in the storage area to fix the position of the convertible furniture piece.

14. The recreational vehicle of claim 13, wherein the recreational vehicle comprises a plurality of tie down securement locations including the tie down securement location and a pair of lateral tie down securement locations spaced laterally from the tie down securement location with the tie down securement location positioned between the pair of lateral tie down securement locations, each of the pair of lateral tie down securement locations are positioned adjacent a respective one of the pair of walls of the storage area.

15. The recreational vehicle of claim 1, wherein the attachment hardware comprises a coupling bracket fixed to the platform and a pin that extends through the coupling bracket and the convertible furniture piece to attach the convertible furniture piece to the platform.

16. The recreational vehicle of claim 15, wherein the attachment hardware comprises a hole formed in the side support frames, the pin of the attachment hardware extends through the hole formed in the side support frames.

17. The recreational vehicle of claim 16, wherein the side support frames each comprises an outer side and an opposite inner side that is pivotally coupled to the base frame, and the hole is positioned along the side support frames closer to the inner side than the outer side.

18. The recreational vehicle of claim 16, wherein:
the convertible furniture piece comprises a first portion and a second portion;
the first portion of the convertible furniture piece comprises one of the side support frames and a portion of the base frame extending from a center of the base frame to a first side of the base frame,
the second portion of the convertible furniture piece comprises the other of the side support frames and a portion of the base frame extending from the center of the base frame to a second side of the base frame opposite the first side; and the attachment hardware comprises a first hole formed in the one of the side support frames between a center of gravity of the first portion and the center of the base frame, and a second hole formed in the other of the side support frames between a center of gravity of the second portion and the center of the base frame.

19. The recreational vehicle of claim 1, wherein:
the lift system further comprises a lift motor or a manual crank operatively coupled to the platform to raise and lower the platform;
the platform of the lift system forms an upper sleeping surface as a top bunk over the convertible furniture piece in the bed configuration;
the at least one countertop is a single countertop attached to only one of the pair of side support frames;
the convertible furniture piece further comprises a mattress disposed within a cavity defined by the side support frames;
the side support frames further define a bed frame for supporting the mattress when in the bed configuration;
the countertop extends from the one of the side support frames to contact the floor of the storage area and support the one of the side support frames;
the convertible furniture piece further comprises a stand extending from the other of the side support frames to contact the floor of the storage area and support the other of the side support frames, and one or more linkages that movably couple the countertop to one of the side support frames; and
the countertop is movable between a table mode and a collapsed mode, in the collapsed mode, the countertop extends in parallel with the planar sleeping surface, and in the table mode, the countertop extends perpendicularly to the planar sleeping surface.

20. A convertible furniture system comprising a lift system, attachment hardware, and a convertible furniture piece selectively attachable to the lift system using the attachment hardware, wherein:
the lift system comprises a set of vertically extending rails and a platform movably coupled to the set of rails and movable along a length of the rails in a vertical direction;
the convertible furniture piece comprising a base frame, a pair of side support frames each pivotally attached to the base frame to pivot between a countertop configuration and a bed configuration, and at least one countertop attached to at least one of the pair of side support frames;
in the countertop configuration, the side support frames extend from the base frame in the vertical direction to support the countertop above the base frame;
in the bed configuration, the side support frames extend from the base frame in a horizontal direction to define collectively a planar sleeping surface; and
the attachment hardware permits selective attachment of the convertible furniture piece to the platform when the convertible furniture piece is in the bed configuration.

* * * * *